United States Patent [19]

Leighley

[11] Patent Number: 4,938,063

[45] Date of Patent: Jul. 3, 1990

[54] APPARATUS AND METHOD FOR INFUSING A MATERIAL INTO A CLOSED LOOP SYSTEM

[75] Inventor: Kenneth C. Leighley, Stony Brook, N.Y.

[73] Assignee: Spectronics Corporation, Westbury, N.Y.

[21] Appl. No.: 243,758

[22] Filed: Sep. 13, 1988

[51] Int. Cl.⁵ .............................................. G01M 3/22
[52] U.S. Cl. ...................................................... 73/40.7
[58] Field of Search .................... 73/40.7, 40; 252/964

[56] References Cited

U.S. PATENT DOCUMENTS

| | | | |
|---|---|---|---|
| 1,982,325 | 11/1934 | Shepherd | 184/109 |
| 2,930,511 | 3/1960 | Vanerstrom | 73/40.7 X |
| 3,607,784 | 9/1971 | Mlot-Fijalkowski | 252/408.1 |
| 4,249,412 | 2/1981 | Townsend, III | 73/40.7 |
| 4,535,802 | 8/1985 | Robertson | 137/322 |
| 4,612,798 | 9/1986 | Roberts | 73/40.7 |
| 4,693,118 | 9/1987 | Roberts | 73/40.7 |
| 4,745,772 | 5/1988 | Ferris | 62/292 |
| 4,758,366 | 7/1988 | Parekh | 73/40 X |

OTHER PUBLICATIONS

Spectronics Corporation trade literature entitled "Spectroline ® Automotive Leak Detection Systems".

Primary Examiner—Hezron E. Williams
Assistant Examiner—Joseph W. Roskos
Attorney, Agent, or Firm—Seidel, Gonda, Lavorgna & Monaco

[57] ABSTRACT

An apparatus and method for infusing a material into an operating closed loop system. A sealed reservoir, for holding a predetermined amount of material, is provided having an inlet and an outlet. A sealable material fill inlet is provided to admit the desired amount of material into the sealed reservoir. An externally available high pressure system carrier fluid is allowed to enter the reservoir through the inlet via a regulating valve to form a mixture with the held material. Thereafter a mist of the high pressure mixture is infused into the closed loop system through a charging conduit. The charging conduit contains a series of valves and quick-release fittings to insure that the pressurized system carrier fluid and material mixture does not inadvertently escape into the atmosphere or onto the external equipment parts of the closed loop system. In particular, the apparatus and method allow large operating commercial air conditioning and refrigeration systems to be easily and accurately checked for leaks using a predetermined amount of concentrated leak detection fluorescent dye.

21 Claims, 3 Drawing Sheets

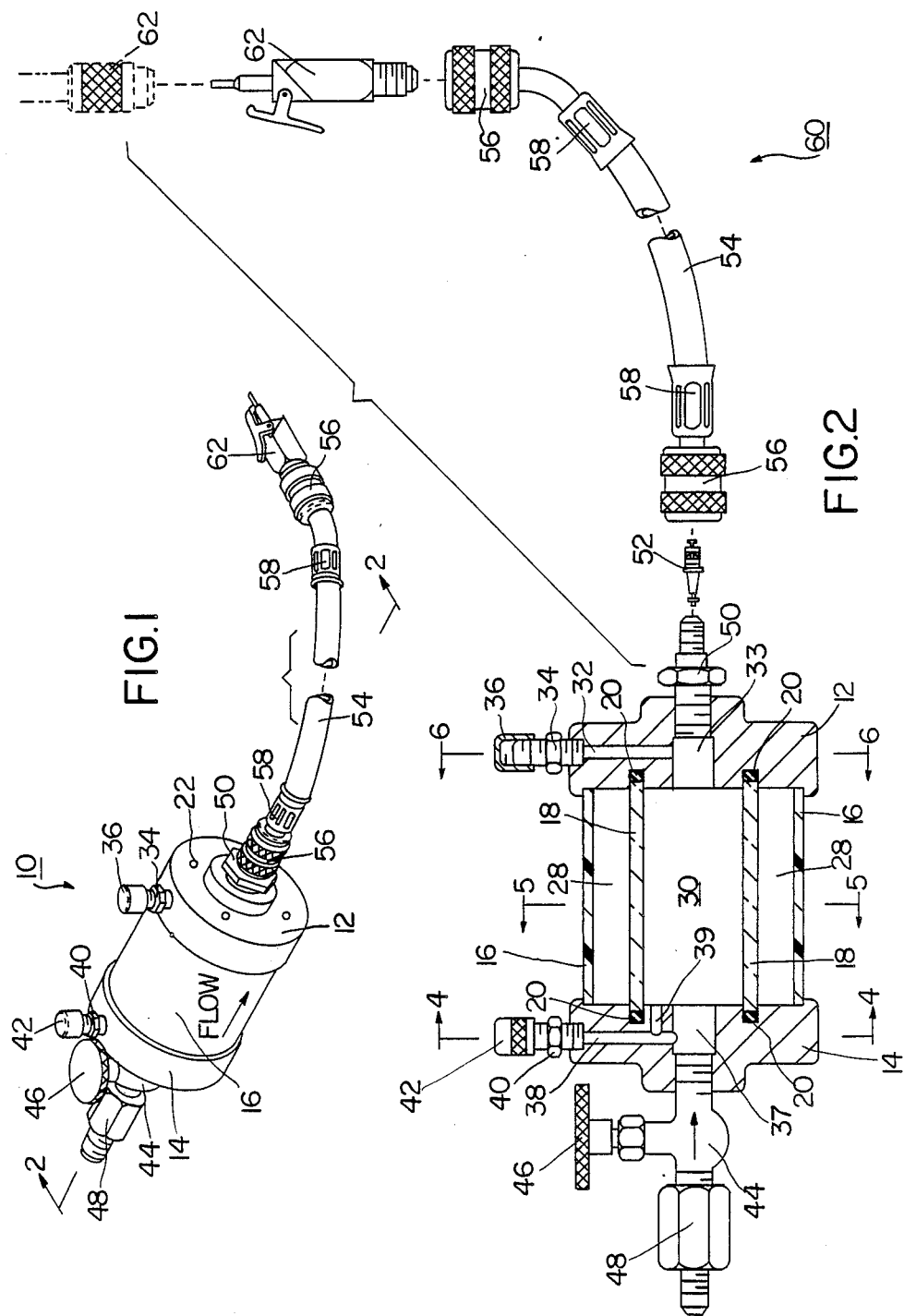

APPARATUS AND METHOD FOR INFUSING A MATERIAL INTO A CLOSED LOOP SYSTEM

FIELD OF THE INVENTION

The present invention is directed to an apparatus and method for neatly and efficiently infusing a desired amount of material into a closed loop system during operation of the system.

In particular, the invention is directed to an apparatus and method for infusing a predetermined amount of a concentrated leak detection material into an operating closed loop air conditioning or refrigeration system.

BACKGROUND OF THE INVENTION AND DESCRIPTION OF THE PRIOR ART

Until recently it was rather difficult to accurately detect leaks in air conditioning and refrigeration systems. Often a serviceman was required to interpret test results which were very vague and ambiguous. One method typically used was to employ a Halide torch requiring the serviceman to observe a particular color change when escaping system chlorofluorocarbon refrigerant material (e.g., FREON®) came in contact with the torch flame. Another common method available was to provide a fluorescent leak detection composition which was applied to the outer surface of a system's equipment or pipes. A composition typically used for that application is disclosed in U.S. Pat. No. 4,249,412.

Not only were those test methods hard to interpret, but they made it troublesome to pinpoint the exact source of a leak. In practice, the serviceman would have difficulty showing a customer the exact location of the leak or leaks. In many cases, the serviceman was more apt to recharge the system with additional refrigerant rather than locating and repairing the existing leak.

In more recent years, it has become common practice in the automotive air conditioning field to provide one pound cans of a pre-mixed formulation of refrigerant and fluorescent dye material to be infused into a closed loop air conditioning system. That practice allows system leaks to be reliably pinpointed when the refrigerant and fluorescent dye formulation is used in conjunction with an ultraviolet light emitting in approximately the 365 nm range. Since the closed loop is under pressure, the fluorescent dye is forced outwardly through any existing holes in the system thereby becoming clearly visible to the human eye upon application of the ultraviolet light. A method and device typical of the pre-mixed formulation system is disclosed in trade literature entitled Spectroline® Automotive Leak Detection Systems which is available through Spectronics Corporation, Westbury, N.Y.

Some advantages of infusing a pre-mixed refrigerant/fluorescent dye formulation instead of relying on the aforementioned methods include: (1) being able to accurately pinpoint the exact source of the leak or leaks; (2) being able to positively recognize the leak without having to interpret the test results; (3) being able to directly show a customer the existing leak or leaks; and (4) making it possible for the leaks to be repaired rather than just refilling the system with additional refrigerant. The importance of being able to detect and repair such leaks is two-fold. First, the efficiency of the system is reestablished following the necessary repairs, and secondly, leaking refrigerant is kept from escaping into the atmosphere, thereby minimizing the depletion of the earth's ozone layer.

However, it is impractical if not impossible to neatly and efficiently charge large commercial air conditioning and refrigeration systems with the existing pre-mixed one pound can formulations of fluorescent dye and refrigerant known in the prior art. Since such systems are closed loops operating under pressure, it has not been possible to repeatedly introduce the fluorescent dye without substantial leakage and contamination. When infusing a system with the pre-mixed formulation, it is most desirable to charge the system with as little carrier refrigerant as possible until the leak or leaks are located, because, in practice, the refrigerant is often vented to the atmosphere when repairing the leak. If any of the pre-mixed formulation is inadvertently spilled onto the system equipment during infusion, examination of the system for traces of refrigerant material becomes impossible, since spillage can mask leaks.

The use of pre-mixed one pound cans of the refrigerant and dye formulation, or even larger commercially available thirty pound cylinders of the refrigerant and dye formulation, do not allow any flexibility in the amount of dye to be added to a particular system. In large commercial air conditioning and refrigeration systems, the dye amount and concentration necessary will vary depending on the weight of the refrigerant charge of that system. Nearly all systems will be either undercharged or overcharged as a result of the use of the pre-mixed can or cylinder formulations. Therefore, if a serviceman is to effectively detect leaks in a large commercial system, various quantities of dye, in various concentrations, must be repeatedly infused into the system. As mentioned above, improperly charging a system will cause fluorescent dye to be spilled onto the system equipment or cause excess refrigerant to be vented to the atmosphere.

Additionally, commercial air conditioning and refrigeration systems use not only various amounts of refrigerant but also various types of refrigerant. Examples of commercially useful refrigerants include FREON® 11, R12, R22, 502, 500, 114, 113, 23, 116, 13, 14, 13B1, and 503. The various types of refrigerants used preclude the practical stocking and supply of the correct concentration and amount of dye formulation necessary for every particular commercial system. Many types of dyes, such as DuPont's Dytel Red Visible Dye, manufactured by the E.I. DuPont de Nemours Co., Wilmington, Delaware, are normally only stocked by distributors in pre-mixed refrigerant/dye formulations containing FREON® 11, 12 and 502.

The novel apparatus and method of the present invention overcome the foregoing deficiencies of the prior art by providing an apparatus and method for neatly and efficiently infusing a mixture of leak detection material and system carrier fluid into a closed loop system for the purpose of detecting and pinpointing leaks. The present invention accomplishes this result in a manner which minimizes the venting of system carrier fluid to the atmosphere while providing a system carrier fluid and leak detection material mixture which is appropriate for a particular sized commercial system. Accordingly, it is an object of the present invention to provide an apparatus and method for infusing a leak detection material into an operating closed loop system which does not have the inherent deficiencies of the prior art.

Other objects and advantages of the present invention will be apparent to those skilled in the art with reference to the attached drawings and the description of the invention which hereinafter follows.

SUMMARY OF THE INVENTION

The present invention provides an apparatus and method for infusing material into an operating pressurized closed loop system.

The apparatus comprises a sealed reservoir having inlet means and outlet means for holding a predetermined amount of material. The reservoir contains a sealable material fill means in communication with the interior of the sealed reservoir for admitting material into the sealed reservoir while substantially maintaining the seal. The apparatus has means for regulating the inflow of externally available high pressure system carrier fluid into the reservoir through the inlet means. High pressure system carrier fluid is allowed to contact material within the reservoir to form a high pressure system carrier fluid and material mixture. Means for connecting the outlet means of the sealed reservoir to the closed loop system are provided for allowing the flow of high pressure system carrier fluid and material mixture from the interior of the sealed reservoir into the closed loop system while the system is in operation.

The method for infusing a material into an operating pressurized closed loop fluid system comprises selecting an amount and concentration of material to be infused into a closed loop system based upon the charge of fluid in the system. A sealed reservoir is filled with the selected amount and concentration of material. Externally available high pressure system carrier fluid is supplied into the sealed reservoir to form a high pressure mixture of material and system carrier fluid. The sealed reservoir is connected to the closed loop system. The closed loop system is infused with the high pressure system carrier fluid and material mixture from the sealed reservoir.

In one embodiment, the apparatus is a hand held mist infuser comprising a sealed cylindrical reservoir having a dye fill inlet fitting positioned within a reservoir outlet end cap and a vent fitting positioned within a reservoir inlet end cap for holding a predetermined amount of concentrated leak detection fluorescent dye. A transparent cylindrical reservoir safety shield surrounds the reservoir and is secured between the reservoir inlet end cap and the reservoir outlet end cap. The mist infuser has a regulating valve for controlling the inflow of externally available high pressure system carrier fluid into the reservoir through the reservoir inlet end cap. System carrier fluid is allowed to contact fluorescent dye within the reservoir to form a high pressure system carrier fluid and dye mixture. A flexible hose containing a series of valves and quick-release fittings connects the reservoir outlet end cap with a closed loop system. The hose allows the high pressure fluid and dye mixture to be neatly and efficiently infused into the closed loop system while the system is in operation. Moreover, a desired amount of concentrated fluorescent dye, corresponding to the capacity of a particular sized system, is controllably infused along with system carrier fluid.

BRIEF DESCRIPTION OF THE DRAWINGS

For the purpose of illustrating the invention, there is shown in the drawings a form which is presently preferred; it being understood, however, that this invention is not limited to the precise arrangements and instrumentality shown.

FIG. 1 is a prospective view of a mist infuser constructed in accordance with one embodiment of the present invention.

FIG. 2 is a cross-sectional view taken along lines 2—2 of FIG. 1 illustrating the mist infuser apparatus and its various internal parts. FIG. 2 also contains an exploded view of a charging hose.

DESCRIPTION OF THE PREFERRED EMBODIMENT

Figure 3:
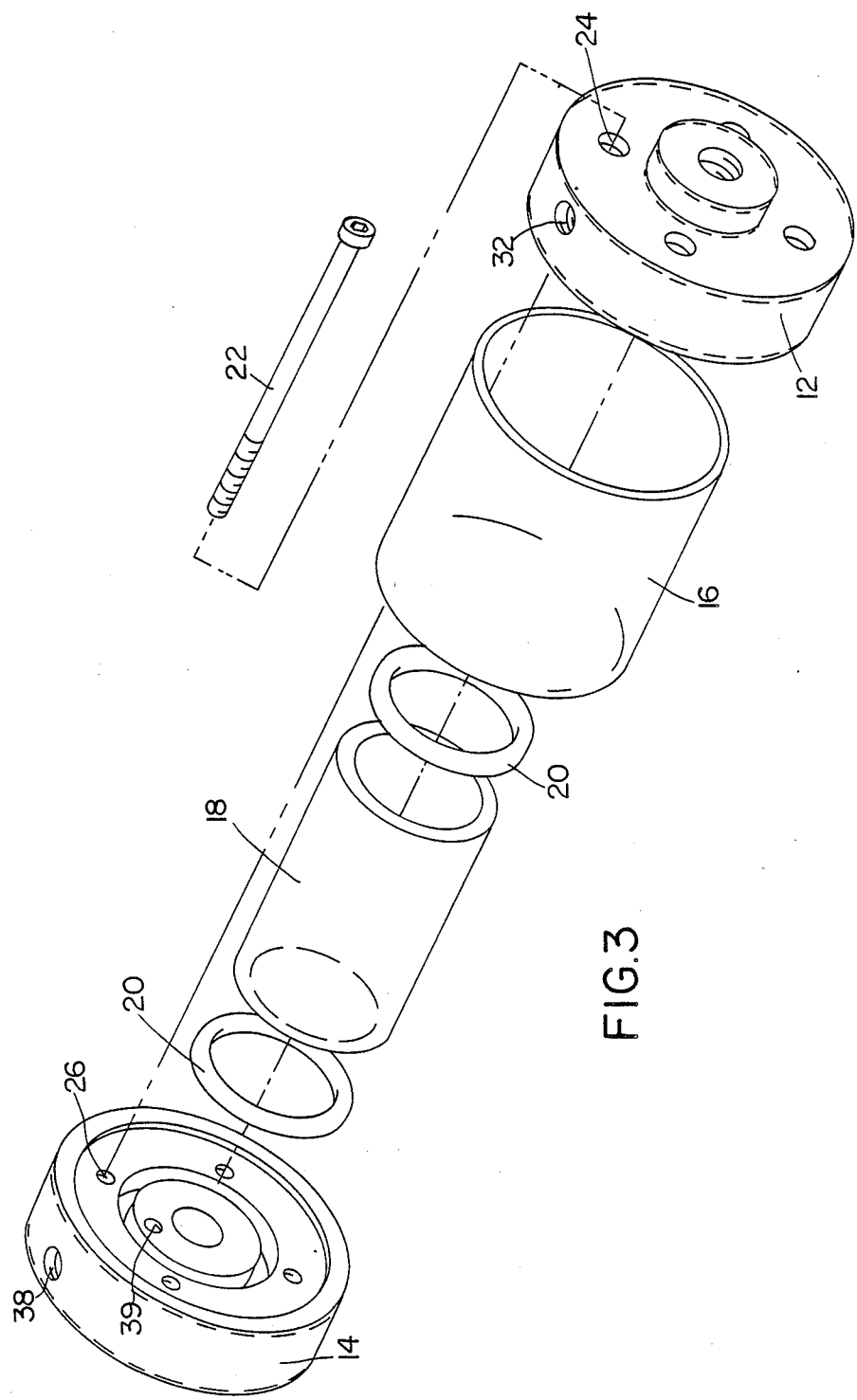
FIG. 3 is an isometric exploded view of a mist infuser apparatus illustrating internal parts.

Referring now to the drawings, wherein like numerals indicate like elements, there is shown in FIG. 1 a mist infuser apparatus 10 capable of either hand held field operation or incorporation into automated filling sequences at a manufacturing factory.

The mist infuser 10 comprises a transparent cylindrical reservoir safety shield 16 closed at one end by a reservoir outlet end cap 12 and closed at the opposite end by a reservoir inlet end cap 14. Safety shield 16 is preferably made of polycarbonate material, although the precise material is not critical to the invention. As shown in FIG. 2 and FIG. 3, within safety shield 16 is a transparent cylindrical reservoir 18 which is also closed at one end by the reservoir outlet end cap 12 and closed at the opposite end by the reservoir inlet end cap 14. Reservoir 18 is preferably made of heat resistant glass, although the precise material is also not critical to the invention. As more fully shown in FIG. 3, reservoir 18 is sealed between outlet end cap 12 and inlet end cap 14 by a pair of "O-rings" 20 of corresponding diameter.

Reservoir 18 and safety shield 16 are fixedly secured between outlet end cap 12 and inlet end cap 14 by a plurality of connecting bolts 22 which extend through holes 24 in outlet end cap 12 and engage corresponding threaded holes 26 in inlet end cap 14. Connecting bolts 22 extend within the annular space 28 between cylindrical reservoir 18 and cylindrical safety shield 16. Within reservoir 18 is a reservoir internal volume 30.

Extending radially outward through the interior body of outlet end cap 12 is a fill inlet bore 32 through which a material, preferably a leak-indicating fluorescent dye, can be administered into the internal volume 30 of reservoir 18 via a center bore 33 within outlet end cap 12. Threadably secured to outlet end cap 12 is a hollow fill inlet fitting 34 positioned in communication with the fill inlet bore 32. Fill inlet fitting 34 permits material to be admitted through fill inlet bore 32 into the reservoir internal volume 30. Removable fill inlet sealing cap 36 is threadably secured to fill inlet fitting 34 to seal the reservoir 18 from the atmosphere once a desired amount of material has been admitted.

Extending radially outward through the interior body of inlet end cap 14 is a vent bore 38 through which unwanted fluid (e.g. air), entrapped in the reservoir internal volume 30, can be purged to the atmosphere as material is admitted into reservoir 18. Reservoir internal volume 30 communicates with vent bore 38 via a center bore 37 within inlet end cap 14. An additional vent bore 39 extends transversely between the outer diameter of reservoir 18 and vent bore 38 to provide another purging outlet for unwanted fluid entrapped in the reservoir internal volume 30. Threadably secured to inlet end cap 14 is a vent fitting 40 positioned in communication with vent bore 38. Removable vent sealing cap 42 is threadably secured over vent fitting 40 to allow the reservoir 18 to be sealed from the atmosphere once a desired amount of material has been admitted.

A regulating needle valve assembly 44 containing an adjustment knob 46 is threadably secured within inlet end cap 14. One end of regulating needle valve assembly 44 extends into inlet end cap 14 for communication with the reservoir internal volume 30 to allow an externally available system carrier fluid to be admitted into the reservoir 18. A regulating valve adapter fitting 48 is threadably attached to the opposite end of regulating valve assembly 44. Adapter fitting 48 is connectable to an externally available high pressure system carrier fluid source (not a part of this invention) through which fluid is supplied to regulating valve assembly 44. System carrier fluid may then be introduced into the reservoir 18 by opening the regulating valve assembly 44 via the adjustment knob 46.

A system charging hose adapter fitting 50 is threadably secured within outlet end cap 12 Charging hose adapter fitting 50 extends into outlet end cap 12 for communication with reservoir internal volume 30 to allow a mixture of the system carrier fluid and reservoir material to be discharged from the reservoir 18. A high pressure refrigeration valve 52, preferably of the type known in the art as a Schrader-type refrigeration valve commercially available from Schrader Automotive, Inc., of Nashville, Tennessee, is positioned within charging hose adapter fitting 50 to regulate the infusing of the mixture of system carrier fluid and reservoir material through charging hose adapter fitting 50 and into a closed loop system. Adapter fitting 50 and valve 52 are generally commercially available as a standard one-piece assembly. Valves 52 are well known and widely used in the art, and need not be described here in detail.

The position of regulating needle valve assembly 44 and charging hose adapter fitting 50 containing valve 52 may be reversed. Reversing valve assembly 44 and adapter fitting 50 containing valve 52 will not depart from the spirit or essential attributes of the present invention.

A flexible charging hose 54 is attached at each end to a quick-release fitting 56 by a crimped hose fastener 58. Charging hose 54, quick-release fittings 56, and crimped hose fasteners 58 together make up a charging hose assembly 60. One end of the charging hose assembly 60 is removably attached to charging hose adapter fitting 50. High pressure refrigeration valve 52 is forced open upon attachment of quick-release fitting 56 with charging hose adapter fitting 50. The opposite end of charging hose assembly 60 containing quick-release fitting 56 is removably attached to a quick-disconnect fitting 62. Quick-disconnect fitting 62 is provided for optional attachment with a system service port fitting which will already be a part of the closed loop system. When the closed loop system port fitting is equipped with a high pressure refrigeration valve, such as valve 52, quick-disconnect fitting 62 will be necessary. When the closed loop system port fitting is equipped with a regulating needle valve, such as valve assembly 44, quick-disconnect fitting 62 will not be necessary.

Figure 4:
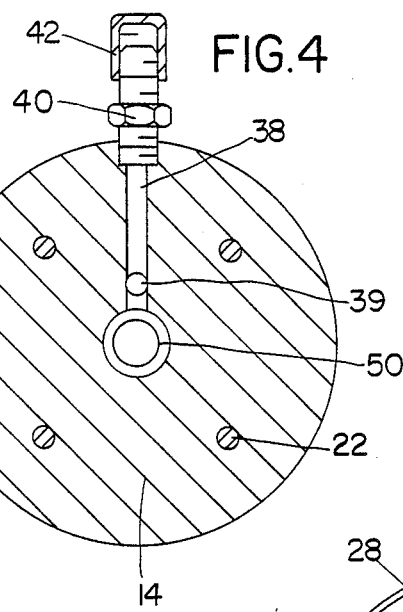
FIG. 4 is a cross-sectional view taken along lines 4—4 of FIG. 2 illustrating a reservoir inlet end cap containing a pair of vent bores.

The plurality of connecting bolts 22 for adjustably sealing and securing the cylindrical reservoir 18 and safety shield 16 to the reservoir inlet end cap 14 are shown in section in FIG. 4. In addition, vent bore 38, extending radially within the reservoir inlet end cap 14 to communicate with vent fitting 40, and vent bore 39 are cross-sectionally shown. Hollow charging hose adapter fitting 50, which is threadably secured within reservoir outlet end cap 12, can be seen centered within this cross-sectional view.

Figure 5:
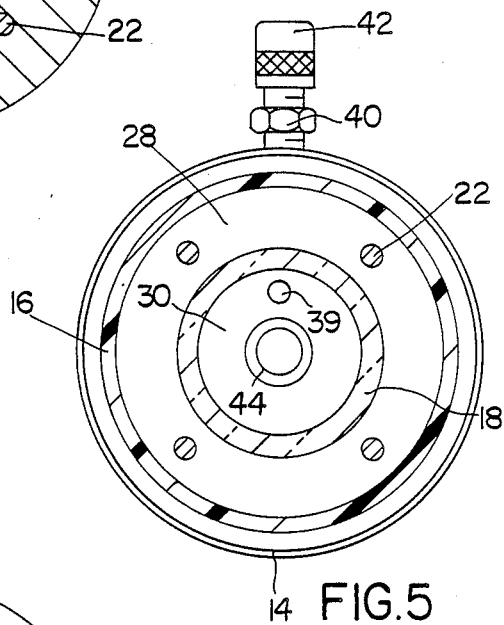
FIG. 5 is a cross-sectional view taken along lines 5—5 of FIG. 2 illustrating a reservoir inlet end cap containing a reservoir safety shield and a reservoir therein.

The cylindrical reservoir safety shield 16 is secured within reservoir inlet end cap 14 and is shown in section in FIG. 5. Within safety shield 16 is reservoir The plurality of connecting bolts 22 are shown positioned within the annular space 28 between safety shield 16 an reservoir 18. The vent bore 39, through which unwanted fluid is purged from reservoir 18 towards vent fitting 40, can be seen within the reservoir internal volume 30. Removable vent sealing cap 42 and the threaded end of hollow regulating needle valve assembly 44 are also shown.

Figure 6:
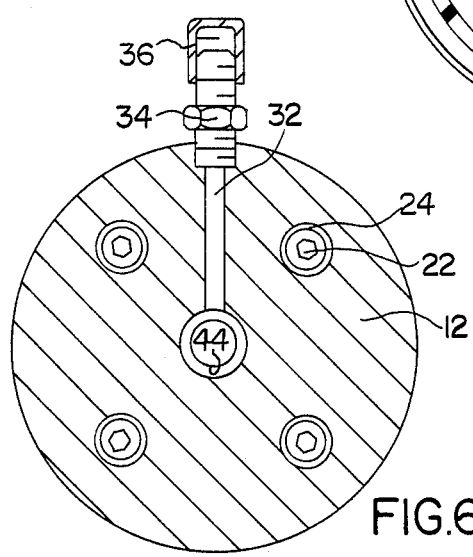
FIG. 6 is a cross-sectional view taken along lines 6—6 of FIG. 2 illustrating a reservoir outlet end cap containing a material fill inlet bore.

The outlet end cap 12 is shown in section in FIG. 6. As shown, the connecting bolts 22 extend through holes 24 within outlet end cap 12. Fill inlet bore 32, extending radially within the reservoir outlet end cap 12 to communicate with hollow fill inlet fitting 34, is cross-sectionally shown. Removable fill inlet sealing cap 36 is threadably secured onto fill inlet fitting 34 to seal reservoir 18 from the atmosphere once material has been admitted. Hollow regulating valve assembly 44, which is threadably secured within reservoir inlet end cap 14, can be seen centered within this cross-sectional view.

The mist infuser apparatus 10 described provides a reservoir for holding various types of material and a configuration of various valves and hoses which permit a serviceman to closely control the infusion of material into a closed loop system. The apparatus is particularly useful for holding various concentrations of fluorescent dye and infusing them, along with system carrier fluid, into an air conditioning or refrigeration system in order to check for leaks. When using the apparatus for infusing leak detection fluorescent dye the following method is preferred.

An amount of concentrated fluorescent dye to be infused into a particular sized closed loop system is determined based upon the charge of system refrigerant employed in that system. The amount must be sufficient to result in a visible indication of a leak but not so great that excessive amounts of dye will be discharged from the leak, since excessive amounts of dye could diffuse over too wide an area and mask the exact location of the leak. The charge (pounds of refrigerant) and type of system refrigerant are normally identified on the nameplate of the system equipment.

Reference is then made to the following chart to determine the type and concentrated amount of fluorescent dye to be infused into the system for systems using from one pound to 50 pounds of refrigerant:

| FORMULA 1 | FORMULA 2 | FORMULA 3 | FORMULA 4 |
|---|---|---|---|
| 1 | 5 | 10 | 25    50 |

For systems over 50 pounds, Formula 4 is used plus the appropriate Formula 1, 2, 3 or 4 to account for the total system charge. For example, if the system refrigerant charge is 70 pounds, Formula 4 plus Formula 3 would be necessary. Each charted Formula represents the following:

Formula 1 = 3–4 wt.% of fluorescent dye based upon 100 wt.% of total formula with the remainder comprising an appropriate refrigeration oil. Used for systems with a charge of 1–4.9 pounds of refrigerant.

Formula 2 = 7–8 wt.% of fluorescent dye based upon 100 wt.% of total formula with the remainder comprising an appropriate refrigeration oil. Used for systems with a charge of 5–9.9 pounds of refrigerant.

Formula 3 = 47–50 wt. % of fluorescent dye based upon 100 wt.% of total formula with the remainder comprising an appropriate refrigeration oil. Used for systems with a charge of 10–24.9 pounds of refrigerant.

Formula 4 = 95–98 wt.% of fluorescent dye based upon 100 wt.% of total formula with the remainder comprising an appropriate refrigeration oil. Used for systems with a charge of 25–50 pounds of refrigerant.

Each of the above formulas are prepared using conventional refrigeration oils which correspond to the recommendation of the equipment manufacturer for that particular system.

Thereafter, the charging hose assembly 60 is disconnected from charging hose adapter fitting 50. Regulating needle valve assembly 44 is then completely closed by turning adjustment knob 46. Fill inlet sealing cap 36 and vent sealing cap 42 are removed by unscrewing them from fill inlet fitting 34 and vent fitting 40, respectively. This will open reservoir 18 to the atmosphere.

Then, mist infuser apparatus 10 is held on a slight angle, of approximately 10° from horizontal, with vent fitting 40 higher than fill inlet fitting 34. The predetermined amount of concentrated fluorescent dye is then admitted to the internal volume 30 of reservoir 18 through the fill inlet fitting 34. As the fluorescent dye descends through fill inlet bore 32 towards the reservoir 18, the displaced unwanted fluid (e.g. air) within the internal reservoir volume 30 is forced outwardly through both vent bore 38 and vent bore 39. As the fluorescent dye level rises within the reservoir 18 all the remaining unwanted fluid is purged to the atmosphere through vent bore 39. When the reservoir is completely filled with the proper concentration of fluorescent dye, the fill inlet sealing cap 36 and the vent sealing cap 42 are replaced by screwing them onto fill inlet fitting 34 and vent fitting 40, respectively.

At this point, the closed loop system to be infused must be examined. If the system service port is equipped with a system service port fitting which does not have a self-contained high pressure refrigeration valve like valve 52, but has a regulating needle valve like valve assembly 44, the quick-disconnect fitting 62 must be removed from quick-release fitting 56 which is attached to the flexible hose 54 by the crimped hose fastener 58. However, if the system service port fitting is equipped with a high pressure refrigeration valve like valve 52, the charging hose assembly 60 should be used with the quick-disconnect fitting 62 in place. The charging hose assembly 60 should then be attached to the system service port for whichever condition exists.

A separate charging hose for carrying an externally available high pressure system carrier fluid, which has been purged of air or other unwanted fluid, is then installed between an external charging manifold (not shown) and the regulating valve adapter fitting 48. All connections are securely tightened.

Charging hose assembly 60 is then purged by letting a small amount of refrigerant out of the closed loop system. Once the charging hose assembly 60 is purged, it is securely attached to the hollow charging hose adapter fitting 50 by means of the quick-release fitting 56.

The regulating needle valve assembly 44 is slowly opened by turning adjustment knob 46 to charge the mist infuser apparatus 10 with the high pressure system carrier fluid. A serviceman can observe the fluid contact the fluorescent dye within the internal reservoir volume 30 through the transparent safety shield 16 and reservoir 18. The rate of infusion to the system of the mixture created by the system carrier fluid and fluorescent dye can be controlled by the adjustment knob 46. Thereby the serviceman can prevent slugging and follow the system manufacturer's recommendations by monitoring the visible flow of materials.

Once the system is fully charged and all the fluorescent dye has been infused into the system, the externally available system carrier fluid source is shut off. Then the adjustment knob 46 is turned to close the regulating needle valve assembly 44. Thereafter the system service port regulating valve is closed, or if absent, the quick-disconnect fitting 62 is removed from the system service port.

After the fluorescent dye has been allowed to circulate for a few minutes within the closed loop system, the system is examined for leaks using an ultraviolet light source to detect traces of fluorescent material. This will allow large leaks to be detected immediately. However, very small leaks in the system may require the system to be run for a few hours to allow the fluorescent dye to migrate to an outside surface.

It can be seen that this invention solves the problems of improperly charging a large commercial system and inadvertently spilling fluorescent dye onto system equipment which are inherent in the prior art. The apparatus and method of the present invention allow a predetermined amount of concentrated leak detection fluorescent dye to be infused, along with a system carrier fluid, into a large operating closed loop air conditioning or refrigeration system based upon the fluid charge of the applicable system. Thus, the venting of refrigerant to the atmosphere and the inadvertent spilling of fluorescent dye are kept at a minimum.

The present invention may be embodied in other specific forms without departing from the spirit or essential attributes thereof and, accordingly, reference should be made to the appended claims, rather than to the foregoing specifications, as indicating the scope of the invention.

I claim:

1. An apparatus for infusing a liquid material into an operating pressurized closed loop air conditioning or refrigeration system comprising:

(a) a sealed reservoir having inlet means and outlet means for holding a predetermined amount of liquid material;

(b) a sealable material fill means in communication with the interior of the sealed reservoir for admitting liquid material into the sealed reservoir while substantially maintaining the seal;

(c) means for selectively regulating the inflow of an externally available high pressure system carrier fluid into the reservoir through the inlet means for allowing system carrier fluid to contact the liquid material within the reservoir and form a high pressure system carrier fluid and liquid material mixture; and (e) means for connecting the outlet means of the sealed reservoir to the closed loop system for allowing the selectively regulated flow of high pressure system carrier fluid and liquid material mixture from the interior of the sealed reservoir to the closed loop air conditioning or refrigeration system.

2. An apparatus according to claim 1, wherein the liquid material is a fluorescent dye and refrigeration oil mixture capable of being detected in the presence of ultraviolet light.

3. An apparatus according to claim 1, wherein the system carrier fluid is a man-made chlorofluorocarbon or fluorocarbon refrigerant.

4. An apparatus according to claim 1, wherein the reservoir further comprises means for permitting visual observation of the interior of the reservoir.

5. An apparatus for infusing material into an operating pressurized closed loop system comprising:
(a) a sealed reservoir for holding a predetermined amount of material, the reservoir having an inlet end cap and an outlet end cap;
(b) a sealable material fill means in communication with the interior of the sealed reservoir for admitting material into the sealed reservoir while substantially maintaining the seal;
(c) a sealable vent means in communication with the interior of the sealed reservoir for allowing the interior of the reservoir to be simultaneously purged as material is admitted through the material fill means while substantially maintaining the seal;
(d) means for regulating the inflow of an externally available high pressure system carrier fluid into the sealed reservoir through the inlet end cap for allowing system carrier fluid to contact material within the interior of the sealed reservoir and form a high pressure system carrier fluid and material mixture; and
(e) means for connecting the outlet end cap of the sealed reservoir to the closed loop system for allowing the outflow of high pressure system carrier fluid and material mixture from the interior of the sealed reservoir into the closed loop system.

6. An apparatus according to claim 5, wherein the reservoir further comprises means for permitting visual observation of the interior of the reservoir.

7. An apparatus according to claim 6, further comprising a shield means operatively juxtaposed with the means for permitting visual observation.

8. An apparatus for infusing material into an operating pressurized closed lop system comprising:
(a) a sealed cylindrical reservoir for holding a predetermined amount of material, the reservoir having an inlet end cap and an outlet end cap;
(b) means for shielding the cylindrical reservoir;
(c) a sealable material fill means in communication with the interior of the sealed reservoir for admitting material into the sealed reservoir while substantially maintaining the seal;
(d) a sealable vent means in communication with the interior of the sealed reservoir for allowing the interior of the reservoir to be simultaneously purged as material is admitted through the material fill means while substantially maintaining the seal;
(e) means for regulating the inflow of an externally available high pressure system carrier fluid into the sealed reservoir through the inlet end cap for allowing system carrier fluid to contact material within the interior of the sealed reservoir and form a high pressure system carrier fluid and material mixture; and
(f) means for connecting the outlet end cap of the sealed reservoir to the closed loop system for allowing the outflow of high pressure system carrier fluid and material mixture from the interior of the sealed reservoir into the closed loop system.

9. An apparatus according to claim 8, wherein the sealed cylindrical reservoir is at least partially transparent.

10. An apparatus according to claim 8, wherein the reservoir is secured between the inlet end cap and the outlet end cap by securing means.

11. An apparatus according to claim 10, wherein the securing means is a plurality of connecting bolts.

12. An apparatus according to claim 8, further comprising resilient sealing means for sealing the juncture between the inlet end cap and the reservoir and the outlet end cap and the reservoir.

13. An apparatus according to claim 8, wherein the means for shielding the cylindrical reservoir is a substantially transparent cylindrical reservoir safety shield which substantially surrounds the sealed reservoir.

14. An apparatus according to claim 8, wherein the means for regulating the inflow of externally available high pressure system carrier fluid is a needle valve.

15. An apparatus according to claim 9, wherein the means for connecting the outlet end cap to the closed loop system is a flexible conduit.

16. A method for infusing a selectively regulated inflow of a liquid material into an operating pressurized closed loop fluid air conditioning or refrigeration system comprising the steps of:
(a) selecting an amount and concentration of liquid material to be infused into the closed loop air conditioning or refrigeration system based upon the charge of fluid in the system;
(b) filling a sealed reservoir with the selected amount and concentration of liquid material;
(c) supplying an externally available high pressure system carrier fluid into the sealed reservoir to form a high pressure mixture of liquid material and system carrier fluid;
(d) connecting the sealed reservoir to the closed loop air conditioning or refrigeration system; and
(e) infusing the closed loop air conditioning or refrigeration system with a selectively regulated amount of the high pressure mixture of liquid material and system carrier fluid from the sealed reservoir.

17. A method according to claim 16, wherein the step of filling the sealed reservoir further comprises filling the reservoir without substantially breaking the seal.

18. A method according to claim 17, which further comprises the step of simultaneously purging the reservoir as the reservoir is being filled with liquid material.

19. A method according to claim 16, which further comprises the step of selectively regulating the inflow of high pressure system carrier fluid being supplied into the reservoir.

20. A method for infusing a fluorescent liquid dye and refrigeration oil mixture into an operating pressurized closed loop fluid air conditioning or refrigeration system comprising the steps of:
  (a) selecting an amount and concentration of the fluorescent liquid dye and refrigeration oil mixture to be infused into the closed loop air conditioning or refrigeration system based upon the charge of fluid in the system;
  (b) filling a sealed reservoir with the selected amount and concentration of the fluorescent liquid dye and refrigeration oil mixture;
  (c) supplying an externally available high pressure system carrier fluid in a selectively regulated amount int the sealed reservoir to form a high pressure mixture of the fluorescent liquid dye and refrigeration oil mixture with the system carrier fluid;
  (d) connecting the sealed reservoir to the closed loop air conditioning or refrigeration system; and
  (e) infusing the closed loop air conditioning or refrigeration system with a selectively regulated amount of the high pressure mixture from the sealed reservoir.

21. A method according to claim 20, which further comprises illuminating the infused closed loop system with ultraviolet light to permit visual observation of the system for leaks revealed by escaping fluorescent dye.

* * * * *